Jan. 15, 1929.

C. H. NORTH 1,699,307

BRAKE

Filed May 10, 1927

INVENTOR.
Charles H. North.
BY
ATTORNEYS.

Patented Jan. 15, 1929.

UNITED STATES PATENT OFFICE.

1,699,307

CHARLES H. NORTH, OF SAN FRANCISCO, CALIFORNIA.

BRAKE.

Application filed May 10, 1927. Serial No. 190,167.

This invention relates to an automobile construction and particularly pertains to the wheel brakes therefor.

In the design of automobile brakes it is usually the practice to provide a brake drum which is carried with the wheel, and within which drum a brake shoe is positioned and is provided with means for moving or expanding it outwardly to frictionally engage the inner annular surface of the drum. It is one of the problems in the design of brakes of this character to provide actuating means which will insure that the brake will be equally expanded within the drum, and will therefore have uniform frictional contact therewith to prevent excessive wearing of the brake shoe at any point thereon, and it is also desirable to provide an actuating mechanism which will insure that a maximum frictional engagement between the brake shoe and its drum may be brought out by minimum effort on the part of the automobile driver. It is the principal object of the present invention, therefore, to provide a brake of the internal drum type which is so designed as to uniformly apply expanding pressure to the brake drum and to insure that the pressure will be exerted by the lever mechanism actuated by the driver, and will be increased by the frictional engagement between the brake drum and its shoe.

The present invention contemplates the use of a cylindrical brake drum within which a flexible and expansible shoe is disposed, said shoe being fitted with means whereby it may be simultaneously expanded at a plurality of points throughout its length, and whereby frictional contact between the shoe and the brake drum will act to increase the expansive force.

The invention is illustrated by way of example by the accompanying drawings, in which.

Figure 1:
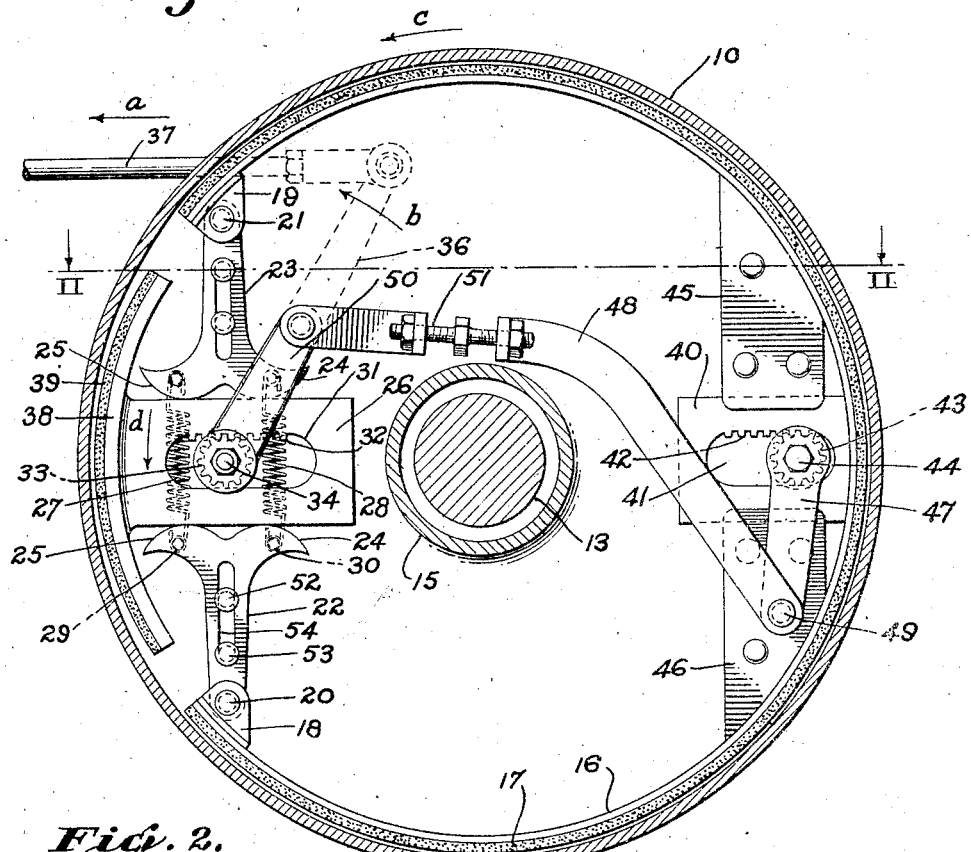
Fig. 1 is a view in vertical end elevation showing the complete brake structure with which the present invention is concerned.
Figure 2:
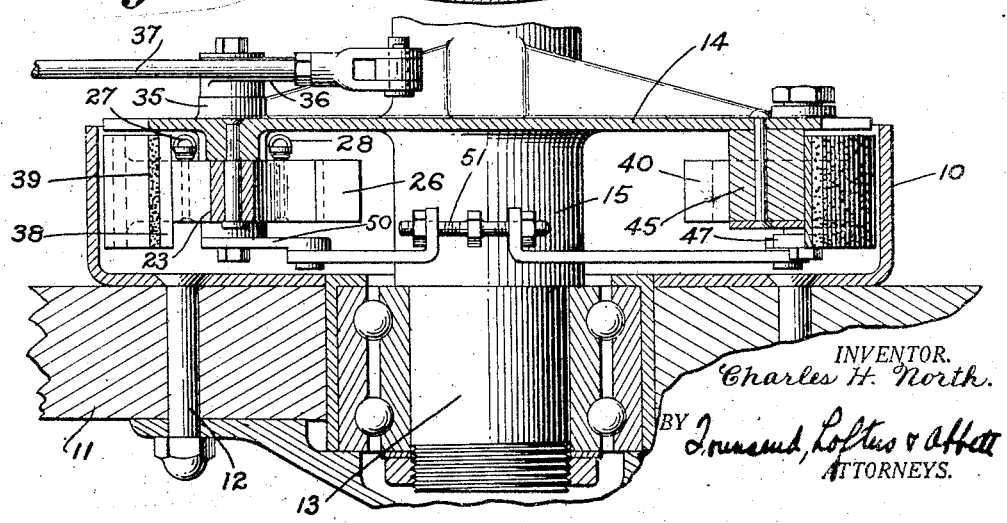
Fig. 2 is a view in horizontal transverse section through the brake structure, as seen on the lines 2—2 of Fig. 1.

Referring more particularly to the drawings, 10 indicates a cylindrical brake drum which is disposed against the side of an automobile wheel 11, and is secured by bolts 12. An automobile axle 13 extends through the brake drum and drives the wheel 11 and the drum. A circular flange 14 is formed as a part of the axle housing 15 and serves to support certain parts of the brake structure, as will be hereinafter explained. Mounted within the brake drum is a flexible brake shoe 16. This shoe carries a brake lining 17 formed of a suitable material which has a high coefficient of friction and which lining may be brought to bear against the circumscribing interior wall of the drum 10. The flexible band 16 forms the main brake shoe of the structure. This band is shaped to be normally concentric to the brake drum and to support the brake lining in uniform spaced relation from the inner surface of the drum under normal conditions. As seen in Fig. 1 of the drawings, the main brake shoe comprising the band 16 and its lining 17 extends substantially three-fourths of the circumferential length of the cylindrical portion of the brake drum. The free ends of the brake shoe structure are fitted with bearing members 18 and 19 respectively carrying pivot pins 20 and 21. Shifting members 22 and 23 are pivotally secured to the members 18 and 19 by the pivot pins. The shifting members are substantially T-shaped, the cross portion of the T being formed by two oppositely extending face cams 24 and 25, which cams represent segments of circles, the centers of which dispose on center lines equi-distant upon opposite sides of the center line of the shifting members, thus providing two arcuate faces which simultaneously contact with the sides of a floating lever block 26. This block is disposed between the cam portions of the two shifting members 22 and 23, and the cams are held in constant contact with the parallel sides of the block 26 by tension springs 27 and 28. These springs are hooked over pins 29 and 30, one of which is carried by each of the shifting members. The floating lever block is disposed with its longitudinal center on the horizontal transverse center of the axle. The center of this block is formed with an elongated opening 31, the upper edge of which is formed with a gear rack 32. A pinion 33 extends into the elongated opening 31 and its teeth mesh with the teeth of the gear rack. The pinion is mounted upon a shaft 34 extending through the housing flange 14 and through a bearing 35. A brake operating lever 36 is keyed to the outer end of the shaft 34, and is operated by a connecting rod 37, which extends to a suitable hand and foot operated brake lever. By this arrangement it will be seen that when the connecting rod 37 is drawn in the direction of the arrow a, as indicated in Fig. 1, the pinion 33 will be rotated and will shift the floating lever block outwardly and radially of the brake drum. Mounted upon the outer end of the lever block 26 is a segmental brake shoe 38 which carries a brake surface 39. It is intended that when the floating lever block is shifted outwardly the brake surface 39 will engage the inner circumferential face of the drum and will tend to move with the drum in its direction of travel and while swinging around the brake pinion 34. Attention is directed to the fact that the friction surface of the shoe 38 is not concentric with the interior of the brake drum, thus permitting it to have a slight rolling action as the drum rotates so that there will not be excessive binding and wedging at the ends of the auxiliary brake shoe. The movement of the brake shoe with the drum will also tend to swing the floating lever block from its normal position, at which time its longitudinal axis stood radially of the axle, and in swinging the lever block will act upon one of the cam surfaces 24 and 25 of each of the shifting members 22 and 23 to expand the brake shoe 16. It is desirable during the same operation to expand the brake shoe 16 at a point intermediate its free ends. This is done by providing a rack block 40 which is secured to the brake shoe 16, at a point intermediate the ends of the shoe and with the block extending radially of the axle. An elongated opening 41 is formed in this block, the upper face of which opening is formed with a gear rack 42 with which teeth of a pinion 43 mesh. This pinion is carried upon a shaft 44. Guide members 45 and 46 determine the path of travel along which the block 40 may shift when the pinion 43 is rotated. Secured to one end of the pinion shaft 44 is a lever 47 to which a connecting rod 48 is pivotally secured by a pin 49. This rod extends upwardly and over the axle housing 15 to engage a lever 50 which is secured to the shaft 34 of the pinion 33. It may be desirable to adjust the levers 47 and 50 with relation to each other, and with that purpose in view the connecting rod 48 is here shown as being broken and with an adjusting bolt 51 interposed between its separate parts.

In operation of the present invention the brake is assembled as shown, and adjustment made at 51 so that the braking faces of the main brake shoe 16 and the auxiliary shoe 38 will be equi-distant from the brake surface of the drum 10. The free ends of the main brake shoe are also spaced the same distance from the brake surface, due to the fixed dimensions of the shifting members 22 and 23. When the brake is applied the connecting rod 37 is pulled in the direction of the arrow a. This will swing the lever 36 in the direction of the arrow b, as indicated in Fig. 1, and will rotate the pinion 33 in the same direction. Simultaneously the levers 50 and 47 will be swung, due to the operative connections between them through the member 48. As these levers are swung the pinions 33 and 43 will rotate in unison and will act to shift the floating lever block 26 and the rack block 40 in diametrically opposite directions from the center of the axle. When the friction lining 39 of the auxiliary brake shoe 38 contacts with the braking surface of the brake drum 10 the entire auxiliary brake shoe will tend to move with the drum. Assuming, for example, that the brake drum is moving in the direction of the arrow c, it will be evident that the auxiliary brake shoe will tend to swing around the pinion 33 in the direction of the arrow d. In this swinging operation the floating lever block will also be swung and will act to separate the shifting members 22 and 23. This action is brought about when the pressure is exerted upon cam 25 of the shifting member 22, and upon cam 24 of the shifting member 23. The shifting members will thus be moved in diametrically opposite directions although in longitudinal alignment. This alignment is maintained by pins 52 and 53 which extend through longitudinally disposed slots 54 in the two shifting members 22 and 23. As the shifting members 22 and 23 move in opposite directions they will act upon the free ends of the main brake shoe 16 and cause them to be shifted outwardly to engage the braking surface of the drum. It will thus be seen that when the brake is applied the main brake shoe will be expanded at three points, to-wit: the center of the brake shoe 16 and at its two free ends, and it will be further evident that in addition to the force obtained through the lever mechanism connecting the operating lever or pedal with the brakes, the friction between the brake and its auxiliary shoe will increase the expansive action of the shoe within the drum, and will thereby increase the effective braking action of the brake.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A brake structure comprising a cylindrical brake drum having an internal braking face, a main expanding brake shoe disposed within said drum and extending along a portion of the circumferential length of the braking face, an auxiliary brake shoe extending along a portion of the circumferential face of the brake drum, and means whereby frictional engagement between the auxiliary brake shoe and the drum will act upon the ends of said expanding brake shoe to create additional expansive pressure thereupon, whereby an increased braking effect will be exerted by the main brake shoe.

2. An automobile brake comprising a brake drum having an internal braking face, a main expanding brake shoe within said drum and adapted to contact with the braking face thereof, means for exerting an outward force upon the main brake shoe at a point intermediate its length to move it into contact with the drum, an auxiliary brake shoe normally out of engagement with the braking face of the drum, means for simultaneously moving it outwardly into contact with the drum as the main brake shoe is moved, and means co-operating with said auxiliary shoe for expanding the main shoe when said auxiliary shoe contacts with the drum.

3. An automobile brake comprising a brake drum having an internal braking face, an expanding brake shoe within said drum and adapted to be moved unexpanded into contact with the braking face thereof, an auxiliary brake shoe normally out of engagement with the braking face of the drum, means for simultaneously moving said auxiliary shoe outwardly as the main brake shoe is moved into contact with said drum and means whereby frictional engagement between the auxiliary brake shoe and the braking face of the drum will act to cause said expanding brake shoe to expand and exert a substantially uniform braking effect throughout its length upon said drum.

4. A brake structure comprising a cylindrical brake drum having an internal braking surface, a main expanding brake shoe disposed within said drum, a radially movable support for said main brake shoe intermediate its ends, a radially movable auxiliary brake shoe mounted to rock freely upon its support when brought into frictional contact with said drum when the latter is rotating, means for moving said main shoe with its support and said auxiliary shoe radially into contact with the drum, and means between the free ends of said main shoe and said auxiliary shoe whereby said main brake shoe will be uniformly expanded throughout its length as said auxiliary shoe is rocked by said drum.

5. A brake structure comprising a cylindrical brake drum having an internal braking surface, a main expanding brake shoe disposed within said drum, a radially movable support for said main brake shoe intermediate its ends, a radially movable auxiliary brake shoe mounted to freely rock upon its support when brought into frictional contact with said drum when rotating, rack and gear mechanism for moving said main and auxiliary brake shoes radially, means connected with said rack mechanisms for simultaneously moving said main shoe with its support and said auxiliary shoe radially into contact with the drum, and oppositely disposed pressure members between the free ends of said main shoe and said auxiliary shoe adapted to exert an expanding force upon said main brake shoe when said auxiliary shoe is rocked by reason of engagement with said drum.

CHARLES E. NORTH.